3,582,487
Patented June 1, 1971

3,582,487
POLYESTER MOULDING AND COATING COMPOSITIONS HARDENING BY ULTRA-VIOLET RADIATION IN THE PRESENCE OF A BENZOIN ARYL ETHER PHOTOSENSITIZER
Karl Fuhr, Krefeld, Hans Rudolph, Krefeld-Bockum, and Wolfgang Metzner, Krefeld, Germany, assignors to Farbenfabriken Bayer Aktiengesellschaft, Leverkusen, Germany
No Drawing. Filed May 26, 1969, Ser. No. 827,898
Claims priority, application Germany, June 11, 1968, P 17 69 576.0
Int. Cl. C08f 1/00, 21/00
U.S. Cl. 204—159.15     4 Claims

ABSTRACT OF THE DISCLOSURE

The present invention relates to moulding and coating compositions hardening by ultra-violet irradiation and obtained from mixtures of unsaturated polyesters and copolymerisable monomeric compounds with a content of benzoin aryl ethers as photosensitizers.

---

The action of photosensitizers, when used for polymerisable substances, is extremely substrate-specific as is evident from many publications.

As sensitizers for photochemical polymerisation of polyester moulding and coating compositions, substances were previously known which belong to the following groups: (1) O-alkyl-xanthic acid esters which are activated in the β-position to the sulphur atom by a double bond (U.S. 2,716,633); (2) aromatic disulphides (German published patent specification No. 1,233,594); (3) certain halogen compounds [C. M. McCloskey, J. Bond, Ind. Engng. Chem. 47, 2125 (1955)]; and (4) benzoin, α-substituted benzoins (U.S. 2,722,512) and benzoin ethers of primary alcohols (F.P. 1,540,589).

Not one of the compounds belonging to these groups has proved to be suitable in industry, since substantial disadvantages counteract their application. The compounds mentioned under (1) as well as the substances mentioned under (2) are difficult to obtain and do not satisfy the demands required of them with respect to their reactivity. Because of their insufficient reactivity and, moreover, on account of strong discolourations of the hardened mouldings the compounds mentioned under (3) were also not satisfactory. On the other hand, the main disadvantage of the compounds mentioned under (4) consists in that the appropriately modified moulding and coating compositions are not stable upon storage in the dark so that they cannot be used as one-component systems.

The instant invention comprises moulding and coating compositions hardening by ultra-violet irradiation and obtained from mixtures of unsaturated polyesters and copolymerisable monomeric compounds containing as photosensitizers benzoin aryl ethers of the formula

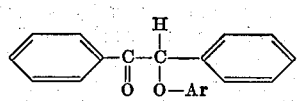

Ar meaning an aromatic radical.

Examples of such sensitizers are the benzoin ethers of phenol, 2-cresol, 3-cresol, 4-cresol, 3,4-dimethylphenol, 2,6-diethylphenol, 4-tert.-butylphenol, 2-methoxyphenol, 4-methoxyphenol, 2-chlorophenol, 4-chlorophenol, 2,6-dichlorophenol, 2,4,6-trichlorophenol, naphthol-(1), naphthol-(2), and of the 2,2-bis-(4-hydroxyphenyl)-propane (bisphenol A).

These compounds can be prepared in known manner, for example, by reacting desyl chloride with sodium salts of appropriate phenols and naphthols.

In comparison with the known compositions, the moulding and coating compositions according to the invention with a content of the above-mentioned benzoin compounds as sensitizers surprisingly possess a substantially improved storage stability in the dark. Upon storage at room temperature, with the exclusion of light, they have a practically unlimited stabilty and are, therefore, eminently suitable, for example, as stable one-component systems.

The values of storage stability in the dark of benzoin and benzoin ethers of primary alcohols, on the one hand, and of phenols, on the other hand, are compared with one another in Table 1 below. The sensitizers were in each case dissolved, admixed with styrene in amounts of 2% by weight in the supply form, stabilised—as usual—with hydroquinone, of a typical unsaturated polyester of maleic acid, phthalic acid and propane-1,2-diol.

TABLE 1

Dark-storage stability of the supply form of a typical polyester resin with a content of 2 percent by weight sensitizer.

| Sensitizer | Storage stability at 60° C., days |
|---|---|
| Benzoin | below 1 |
| Benzoin ethyl ether | below 1 |
| Benzoin isobutyl ether | below 1 |
| Benzoin phenyl ether | 7 |
| Benzoin-4-cresyl ether | 5 |
| Benzoin-4-tert.-butylphenyl ether | 7 |
| Benzoin-4-methoxyphenyl ether | 7 |
| Benzoin-2-chlorophenyl ether | 7 |
| Benzoin-4-chlorophenyl ether | 6 |

The compositions of the invention are also distinguished by possessing a high reactivity which renders a rapid hardening in thin layers possible.

Natural sun light or artificial radiators, the emission of which ranges from 250 to 500 mμ, preferably from 300–400 mμ, can be used as radiation sources for carrying out the photopolymerisation. Mercury vapour, xenon and tungsten lamps are suitable, for example. The compositions according to the invention also harden rapidly to almost colourless mouldings and coatings under the ultra-violet and visible radiation of energy-poor fluorescent lamps with an emission of 300–580 mμ.

The photosensitizers are expediently used in amounts of abut 0.1 to about 5 percent by weight, preferably of about 0.5 to about 2.5 percent by weight, either by themselves or in admixture with one another.

Unsaturated polyesters are the usual polycondensation products of α,β-unsaturated dicarboxylic acids, optionally in admixture with saturated dicarboxylic acids, with polyols.

Copolymerisable monomeric compounds are the unsaturated compounds customarily used in polyester technology, preferably styrene but also, for example, α-methyl-styrene, vinyl-toluene, acrylic acid and methacrylic acid esters and corresponding amides.

As usual the moulding and coating compositions are stabilised by the addition of customary inhibitors, such as p-benzoquinone, hydroquinone, 3 - methyl-catechol or copper compounds, e.g. copper naphthenate, in the known quantities; they may contain other additives usual in polyester chemistry.

Polymerisation catalysts, e.g. peroxides, may be added concurrently in quantities of about 0.1 to about 4 percent by weight. Suitable peroxides are, for example, tert.-butyl perbenzoate, dicumyl peroxide, benzoyl peroxide, lauroyl peroxide, but particularly methyl ethyl ketone peroxide and cyclohexanone peroxide. The addition of peroxides brings about an improved adhesion of the hardened coatings on the substratum. Furthermore, the concurrent use of peroxides, chiefly methyl ethyl ketone peroxide, is especially to be recommended if it is desired to prevent slight discolourations of the hardened product as may occur upon irradiation, but possibly also upon storage, by the action of light.

In combination with the use of ketone peroxides, metal compounds, such as cobalt, zirconium and vanadine naphthenate, or metal chelates, such as cobalt and zirconium acetyl acetonate, may be added for accelerating the complete hardening. Admittedly, the storage stability of the compositions is decreased when peroxides and metal accelerators are simultaneously present. In such a case, it is therefore advisable to operate according to the so-called active primer method according to which the coating composition is applied to a peroxide-containing layer previously applied to the primary coating.

It is especially advantageous to employ the photosensitizers to be used according to the invention for those coating compositions to which paraffin or wax or wax-like substances are added which separate by flotation at the start of the polymerisation and which prevent the inhibiting action of the atmospheric oxygen. A rational method, adjusted to belt assembly operation, of processing coating compositions necessitates a polymerisation as rapid as possible to give hard coatings. It is true that the polymerisation can be accelerated by the supply of heat; however, since the formation of the paraffin or wax film, necessary for the exclusion of air, is prevented by heat, a thermal additional acceleration, e.g. by infra-red radiation or hot air, can take place only after the film is formed.

For the protection of light-sensitive primary coatings, e.g. light-coloured wood, small amounts of conventional ultraviolet absorbers may be added to the moulding and coating compositions, without the reactivity substantially being impaired.

Furthermore, small quantities of conventional carrier and filling materials as well as thixotropic agents, such as glass fibres, synthetic fibres, silicic acid and talc may be present in the moulding and coating compositions during photopolymerisation.

When mouldings are produced from the sensitized compositions according to the invention, it is particularly advantageous that the compositions can be completely hardened by appropriately dosing irradiation without any appreciable heat evolution and this enables even larger mouldings to be obtained without crack formation. In the absence of peroxides and metal accelerators the hardening may also be interrupted by darkening and completed at any time after storing the prepolymerised products thus obtained.

Example 1

An unsaturated polyester produced by condensation of 152 parts by weight maleic anhydride, 141 parts by weight phthalic anhydride and 195 parts by weight propane-1,2-diol, is mixed with 0.045 part by weight hydroquinone and dissolved in styrene giving a 65 percent by weight solution. Portions of 100 parts by weight of the resultant resin supply form are admixed with 20 parts by weight styrene, 1 part by weight of a 10 percent by weight solution of paraffin (M.P. 52–53° C.) in toluene as well as various benzoin aryl ethers. The solution thus obtained is applied to glass plates by means of a film drawer (500µ) and illuminated with the radiation of a fluorescent lamp. Osram L-lamp for tracing purposes, 40 watt, length 95 cm.) at an interval of 5 cm. The paraffin floating times and the times required for achieving the pencil hardness >6 H are set out in Table 2.

TABLE 2

| Additive, referred to resin supply form, percent by weight | M.P. (° C.) | Floating times of paraffin after, minutes | Pencil hardness >6H after, minutes |
| --- | --- | --- | --- |
| 2 benzoin phenyl ether | 84–85 | 1.5 | 12 |
| 2 benzoin-4-cresyl ether | 90–92 | 1.6 | 12 |
| 2 benzoin-4-tert.-butylphenyl ether | 107 | 2.3 | 13 |
| 2 benzoin-4-methoxyphenyl ether | 81–82 | 3.3 | 20 |
| 2 benzoin-2-chlorophenyl ether | 107–108 | 2.4 | 14 |
| 2 benzoin-4-chlorophenyl ether | 97–98 | 1.8 | 12 |
| 2 4,4'-dimethylbenzoinphenyl ether | 89.5 | 2.6 | 16 |
| 2 4-chlorobenzoinphenyl ether | 110 | 2.6 | 16 |
| 2 4'-chlorobenzoinphenyl ether | 115 | 1.7 | 12 |
| 2 4,4'-dichlorobenzoinphenyl ether | 105 | 2.6 | 17 |

Example 2

100 parts by weight of the resin supply form described in Example 1, 20 parts by weight styrene and 1 part by weight of a 10 percent by weight paraffin solution (M.P. 52–53° C.) in toluene are mixed with various sensitizers and, in addition, with various peroxides, metal-containing compounds and ultra-violet absorbers. Layers of 500µ thickness of these solutions are applied to glass plates by means of a film drawer and exposed at a distance of 5 cm. to the radiation of the fluorescent lamp described above. The paraffin floating times and the times until the pencil hardness >6 H is achieved are contained in Table 3.

TABLE 3

| Additives, referred to resin supply form, percent by weight | Floating times of paraffin after, minutes | Pencil hardness >6H after, minutes |
| --- | --- | --- |
| 2 benzoin phenyl ether<br>4 cyclohexanone peroxide (50% in plastisizer) | 1.8 | 11 |
| 2 benzoin-4-cresyl ether<br>4 methyl ethyl ketone peroxide (40% in plastisizer) | 1.9 | 12 |
| 2 benzoin-4-cresyl ether<br>2 cobalt naphthenate solution (20% in toluene) | 2.0 | 11 |
| 2 benzoin-4-cresyl ether<br>2 cobalt naphthenate solution (30% in toluene)<br>4 methyl ethyl ketone peroxide (40% in plastisizer) | 4.1 | 19 |
| 2 benozoin phenyl ether<br>4 methyl ethyl ketone peroxide (40% in plastisizer)<br>0.25 2-hydroxy-4-methoxy-benzophenone | 4.1 | 35 |
| 2 benzoin-4-chlorophenyl ether<br>4 methyl ethyl ketone peroxide (40% in plastisizer) | 2.5 | 14 |
| 2 benzoin-4-methoxyphenyl ether<br>4 methyl ethyl ketone peroxide (40% in plastisizer) | 3.2 | 21 |
| 2 benzoin-4-tert.-butylphenyl ether<br>0.05 α-cyano-β-(4-methoxyphenyl)-methacrylic acid butyl ester | 4.2 | 18 |

Example 3

An active primer consisting of 50 g. of a nitrocellulose solution (20 percent by weight in ethyl acetate), 18 g. butyl acetate, 20 g. methyl ethyl ketone peroxide (40 percent by weight in plastisizer) and ethyl acetate to make up to a volume of 100 ml., is applied to wood in a layer of 100µ thickness. After evaporation of the solvent, there are applied, each in a layer of thickness of 500µ, (a) a polyester resin mixture consisting of 100 parts by weight of the resin supply form as described in Example 1, 20 parts by weight styrene, 1 part by weight of a 10 percent by weight solution of paraffin (M.P. 52–53° C.) in toluene, 2 parts by weight benzoin phenyl ether, as well as (b) a polyester resin mixture according to (a) to which 2 parts by weight of a cobalt naphthenate solution are added and (c) a polyester resin mixture according to (a) to which 2 parts by weight of a cobalt naphthenate and 0.1 part by weight of an ultra-violet absorber are added, and these films are irradiated, after a de-aeration time of 3 minutes, at a distance of 5 cm., with the fluorescent lamp described above. The description of the additives and the results of the polymerisation are contained in Table 4.

TABLE 4

| Additives, referred to resin supply form, percent by weight | Floating times of parraffin after, minutes | Pencil hardness >6H after, minutes |
| --- | --- | --- |
| (a) without additive | 2.7 | 18 |
| (b) 2 cobalt naphthenate solution (20% in toluene) | 3.3 | 24 |
| (c) 2 cobalt naphthenate solution (20% in toluene), 0.1 α-cyano-β-(4-methoxyphenyl)-methacrylic acid butyl ester | 4.9 | 28 |

Example 4

An unsaturated polyester obtained in the presence of 0.83 part by weight hydroquinone by condensing 1765 parts by weight maleic anhydride, 756 parts by weight ethylene glycol, 405 parts by weight butane-1,3-diol and 1540 parts by weight trimethylol propane diallyl ether, is dissolved in styrene to give a 70 percent by weight solution.

100 parts by weight of the resultant supply form and 1 part by weight of a cobalt naphthenate solution (20 percent by weight in toluene) are mixed with various benzoin aryl ethers.

The solution, as layer of 500μ thickness on glass, is illuminated, at a distance of 5 cm., with the fluorescent lamp described above until the film has gelled. The prepolymerisate is thereupon illuminated under the radiation of a mercury vapour high-pressure burner (Philips HPK 125 W/L) at a distance of 10 cm. until the surface of the coating is tack-free. The pencil hardness is then >6 H.

The times required for gelling under the fluorescent lamp and for complete hardening are contained in Table 5.

TABLE 5

| Additive referred to resin supply form, percent by weight | Gelling under the fluorescent tube after, minutes | Complete hardening under the Hg high-pressure burner, pencil hardness >6H after, minutes |
| --- | --- | --- |
| 2 benzoin phenyl ether | 1.0 | 3 |
| 2 benzoin-2-chlorophenyl ether | 1.5 | 4 |
| 2 benzoin-4-methoxyphenyl ether | 2.2 | 6 |
| 2 benzoin-4-tert.-butylphenyl ether | 1.0 | 3 |

We claim:
1. Moulding and coating compositions hardening by ultra-violet irradiation and obtained from mixtures of unsaturated polyesters derived from dicarboxylic acids condensed with polyols and copolymerisable monomeric compounds containing benzoin aryl ethers of the formula

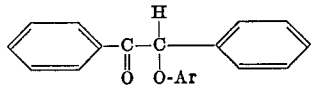

as photosensitizers, Ar meaning an aromatic radical.

2. Moulding and coating compositions according to claim 1, wherein the benzoin aryl ether content amounts to from about 0.1 to about 5% by weight.

3. Moulding and coating compositions according to claim 1 additionally containing peroxide catalysts, metal accelerators, ultra-violet absorbers, carrier and filler materials or thixotropic agents.

4. Moulding and coating compositions according to claim 1 additionally containing paraffin or wax or wax-like substances.

References Cited

UNITED STATES PATENTS

| 2,760,863 | 8/1956 | Plambeck | 96—115 |
| 3,330,659 | 7/1967 | Wainer | 204—159.23 |
| 3,376,136 | 4/1968 | Seide | 96—115 |

SAMUEL H. BLECH, Primary Examiner

R. B. TURER, Assistant Examiner

U.S. Cl. X.R.

117—73, 93.31, 124, 148; 204—159.23; 260—28, 40, 863, 866